US012656279B2

(12) United States Patent
Pois et al.

(10) Patent No.: US 12,656,279 B2
(45) Date of Patent: Jun. 16, 2026

(54) PRODUCTION SOLUTIONS FOR HIGH-THROUGHPUT/PRECISION XPS METROLOGY USING UNSUPERVISED MACHINE LEARNING

(71) Applicant: NOVA MEASURING INSTRUMENTS INC., Fremont, CA (US)

(72) Inventors: Heath Pois, Fremont, CA (US); Dmitry Kislitsyn, Fremont, CA (US); Mark Klare, Poughkeepsie, NY (US); Paul Isbester, Fremont, CA (US); Daniel Kandel, Rehovot (IL); Michal Haim Yachini, Rehovot (IL)

(73) Assignee: NOVA MEASURING INSTRUMENTS INC., Fremont, CA (US)

( * ) Notice: Subject to any disclaimer, the term of this patent is extended or adjusted under 35 U.S.C. 154(b) by 174 days.

(21) Appl. No.: 18/725,804

(22) PCT Filed: Dec. 30, 2022

(86) PCT No.: PCT/US2022/054302
§ 371 (c)(1),
(2) Date: Jun. 30, 2024

(87) PCT Pub. No.: WO2023/129690
PCT Pub. Date: Jul. 6, 2023

(65) Prior Publication Data
US 2025/0067691 A1 Feb. 27, 2025

Related U.S. Application Data

(60) Provisional application No. 63/295,477, filed on Dec. 30, 2021.

(51) Int. Cl.
*G01N 23/223* (2006.01)
*G01N 23/2273* (2018.01)

(52) U.S. Cl.
CPC ....... *G01N 23/223* (2013.01); *G01N 23/2273* (2013.01); *G01N 2223/6116* (2013.01)

(58) Field of Classification Search
CPC ............. G01N 23/223; G01N 23/2273; G01N 2223/6116; G06T 2207/10116; G06T 2207/10121; G06T 2207/30148
See application file for complete search history.

(56) References Cited

U.S. PATENT DOCUMENTS

2017/0266323 A1 9/2017 Tao et al.
2021/0063329 A1* 3/2021 Kuznetsov ............. G01N 23/20

OTHER PUBLICATIONS

Jany, B. R., et al., "Retrieving the Quantitative Chemical Information at Nanoscale from Scanning Electron Microscope Energy Dispersive X-ray Measurements by Machine Learning," Nano LettersVol 17/Issue 11, Oct. 15, 2017.

* cited by examiner

*Primary Examiner* — Casey Bryant
(74) *Attorney, Agent, or Firm* — Reches Patents

(57) ABSTRACT

Determining process excursions in a semiconductor processing using unsupervised machine learning on photoelectron emission dataset obtained by XPS or XRF tool. Principal component analysis is applied to the emission dataset and the variances of each principal component is analyzed to thereby select a number of N principal components whose variance is the highest. All data points of the dataset which do not correspond to any of the N principal components are removed from the dataset to obtain a filtered dataset. An emission intensity is then calculated from the filtered dataset and is plotted on a SPC chart to inspect for excursions.

20 Claims, 4 Drawing Sheets

Obtain Spectra 800 → Apply PCA 805 → Select N PCs 810 → Update Spectra 815 → Calculate intensity 820 → Convert intensity to Property 825 → Plot property on SPA chart 830 → Inspect SPA chart 835

Total B, %AC

Wafer #

XPS → Input Module 900 → PCA Module 905 → Selector Module 910 → Filter Module 915

Intensity Module 920 → Conversion Module 925 → Display Module 930

PRODUCTION SOLUTIONS FOR HIGH-THROUGHPUT/PRECISION XPS METROLOGY USING UNSUPERVISED MACHINE LEARNING

CROSS REFERENCE

This application claims the benefit of the U.S. Provisional Patent Application No. 63/295,477 filed Dec. 30, 2021, the entire content of which is incorporated herein by reference in its entirety.

FIELD

This disclosure generally relates to techniques for monitoring semiconductor processes during production by non-destructively measuring layer thickness and composition on structures using photoelectron spectroscopy and x-ray fluorescence.

BACKGROUND

Integrated circuits typically comprise a number of layers formed on a silicon substrate. As integrated circuits become smaller, and the thickness of the layers comprising the integrated circuits is reduced, the behavior of devices formed from these layers often depends on the thickness or composition of a specific layer. For example, a transistor formed on a silicon substrate may have different characteristics depending on the thickness or composition of the gate of the transistor. Therefore, during fabrication it is highly beneficial to monitor the processes by determining the thickness and composition of layers in the fabricated microelectronic device such as an integrated circuit.

Techniques that may be used to determine a thickness and/or composition of a specific layer in a structure include x-ray photoelectron spectroscopy (XPS), and x-ray fluorescence spectroscopy (XRF). XPS has been used to analyze surface chemistry of substrates, wherein spectra are obtained by irradiating the substrate with a beam of X-rays, while simultaneously measuring the kinetic energy and number of electrons that escape from the top layers of the substrate. Similarly, XRF has been used for elemental and chemical analysis of samples, by sampling the emission of characteristic "secondary" (or fluorescent) X-rays from a material that has been excited by bombarding with high-energy X-rays or gamma rays.

For both XPS and XRF techniques the emission is rather faint, so that in order to achieve a sufficient signal to noise ratio to have a meaningful dataset, the collection period is relatively long. However, during production any introduction of a monitoring element that requires long signal acquisition time slows the production and thus directly affect the efficiency and profitability of the manufacturing process. Consequently, it would be highly beneficial to develop techniques that reduce the signal acquisition time but does not degrade the accuracy of the results.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various disclosed embodiments provide methods and systems for improved signal acquisition in XPS and XRF systems. The disclosed embodiments are especially suitable for monitoring the consistency of the processes during the production of ICs. The embodiments enable investigating characteristics such as composition and thickness of thin films layered over a substrate. Disclosed embodiments have been demonstrated to provide improved analysis results while reducing the standard signal acquisition time by half.

According to aspects of the invention, an XPS or an XRF tool is used to collect emissions from the wafer in a conventional manner, except that the acquisition time is reduced, e.g., by 50%. As a result, the collected dataset is rather noisy, having relatively low signal to noise ratio. The obtained dataset is therefore unsuitable for standard analysis of process monitoring. The quality of the dataset is therefore improved by operation of an unsupervised machine learning. An important aspect of the unsupervised machine learning is its ability to segregate variability in the dataset that contribute to noise, but do not contribute to the ability to identify excursions in the process. The unsupervised machine learning is therefore used to reduce variability in the spectra due to noise.

Disclosed embodiments provide methods for monitoring process excursions in semiconductor processing of an integrated circuit (IC), comprising the steps of irradiating the IC to thereby generate emissions from the IC; collecting the emissions from the IC using one of x-ray photoelectron spectroscopy (XPS) or x-ray fluorescence spectroscopy (XRF) and generating from the emissions a dataset corresponding to count per unit time versus kinetic energy; performing principal component analysis on the dataset to thereby obtain principal component values from the dataset; selecting a number of principal components that exhibit high variance contribution compared to remaining principal components; removing from the dataset all values corresponding to the remaining principal components to thereby obtain filtered dataset; and analyzing the filtered dataset to determine presence of process excursion.

According to further aspects, a method is provided for enhanced statistical process control comprising the steps: obtaining dataset corresponding to photoelectron emission from a sample, the dataset representing the spectra of the photoelectrons emitted from the sample; applying principal component analysis to the dataset to obtain principal component variance for each principal component; examining the variances to select an N number of relevant principal components having the highest variance values; selecting from the dataset all relevant data points belonging to the N number of relevant principal components and using only these data points to update the spectra; using the updated spectra to calculate photoelectron emission intensity; plotting the calculated photoelectron emission intensity on a statistical process control (SPC) chart; and inspecting the SPC chart to identify process excursions.

According to further aspects, a metrology module is provided for monitoring fabrication process of an integrated circuit (IC). The module comprises: an input module receiving signal indicative of emissions from the IC, e.g., from an XPS or XRF metrology tool; a principal component analysis (PCA) module receiving the signal and calculating therefrom variance corresponding to each principal component; a PCA number selector module selecting a number of N principal components according to the calculated variance; a filtering module that selects from the original XPS signal only the data points corresponding to the selected N principal components; an intensity module that uses the selected data points to calculate an intensity value of the emissions; a conversion module converting the emission intensity into material parameter; and a display module that displays the calculated parameter on a monitor, generally in the form of an entry in a PCA chart.

Other aspects provide a machine readable medium having stored thereon executable program which, when executed, causes a machine to perform a method for monitoring a semiconductor fabrication process, the method comprising: receiving a dataset corresponding to photon count per unit time versus kinetic energy of emitted photons obtained by collecting the emissions from the IC using x-ray photoelectron spectroscopy (XPS) and generating the dataset from the emissions; performing principal component analysis on the dataset to thereby obtain principal component values from the dataset; selecting a number of principal components that exhibit high variance contribution compared to remaining principal components; removing from the dataset all values corresponding to the remaining principal components to thereby obtain filtered dataset; and analyzing the filtered dataset to determine presence of process excursion.

Other aspects are disclosed by the detailed description with reference to the drawings.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

One or more embodiments of the present invention are illustrated by way of example and not limitation in the figures of the accompanying drawings, in which like references indicate similar elements and in which:

FIG. 5A illustrates a plot of data obtained using full time acquisition versus data acquired using half time acquisition, while FIG. 5B illustrates a plot of data obtained using full time acquisition versus interpolated data, which is data calculated by interpolating half of the full-time data points, according to disclosed embodiment;

FIG. 6A illustrates the within wafer standard deviation of boron percentage calculated from dataset taken at full time (filled dots) and half time (circles), while FIG. 6B illustrates the standard deviation of boron percentage calculated from dataset taken at full time (filled dots) and a filtered half-time dataset (open circles), i.e., after the half time dataset has been reduced to remove data corresponding to principal components not selected within the N selected principal components, according to disclosed embodiment;

DETAILED DESCRIPTION

The description of aspects of the invention will proceed with reference to different embodiments. Each description of a certain embodiment may highlight specific features. However, it should be understood that the described features may be incorporated in other embodiments as well and that different combination of these features may be assembled to form further embodiments.

Embodiments disclosed herein improves the operation and efficiency of XRF and/or XPS process monitors. For the purpose of this disclosure it is assumed that the reader is fully familiar with the construction and operation of such monitors, which can be gleaned from e.g., Applicant's U.S. Pat. Nos. 10,533,961 and 10,801,978, the disclosures of which are incorporated herein in their entirety for completeness.

As the complexity of structures of semiconductor devices increase, the "noisier" the XPS or XRF signal obtained during monitoring becomes. This leads to increase in the signal acquisition time so as to increase the signal to noise ratio. For example, an important parameter in SiGe:B fabrication of raised source and drain (RSD) transistors is the percentage of boron in the resulting layer. Another important parameter is the thickness of a TiN layer, e.g., in gate electrodes. In fabrication environment it is not only important to measure these parameters, but also to do so as rapidly and efficiently as possible so as to not slow production. Embodiments disclosed herein have been demonstrated to result in halving the acquisition time without any reduction in accuracy for measuring boron percentage in SiGe:B structures. Also, the disclosed embodiments were demonstrated to improve throughput capability by 70% for measuring TiN film thickness. Conversely, when utilizing the same acquisition time, the embodiments were demonstrated to improve precision by 30%.

Figures 1, 2, 3, 4:
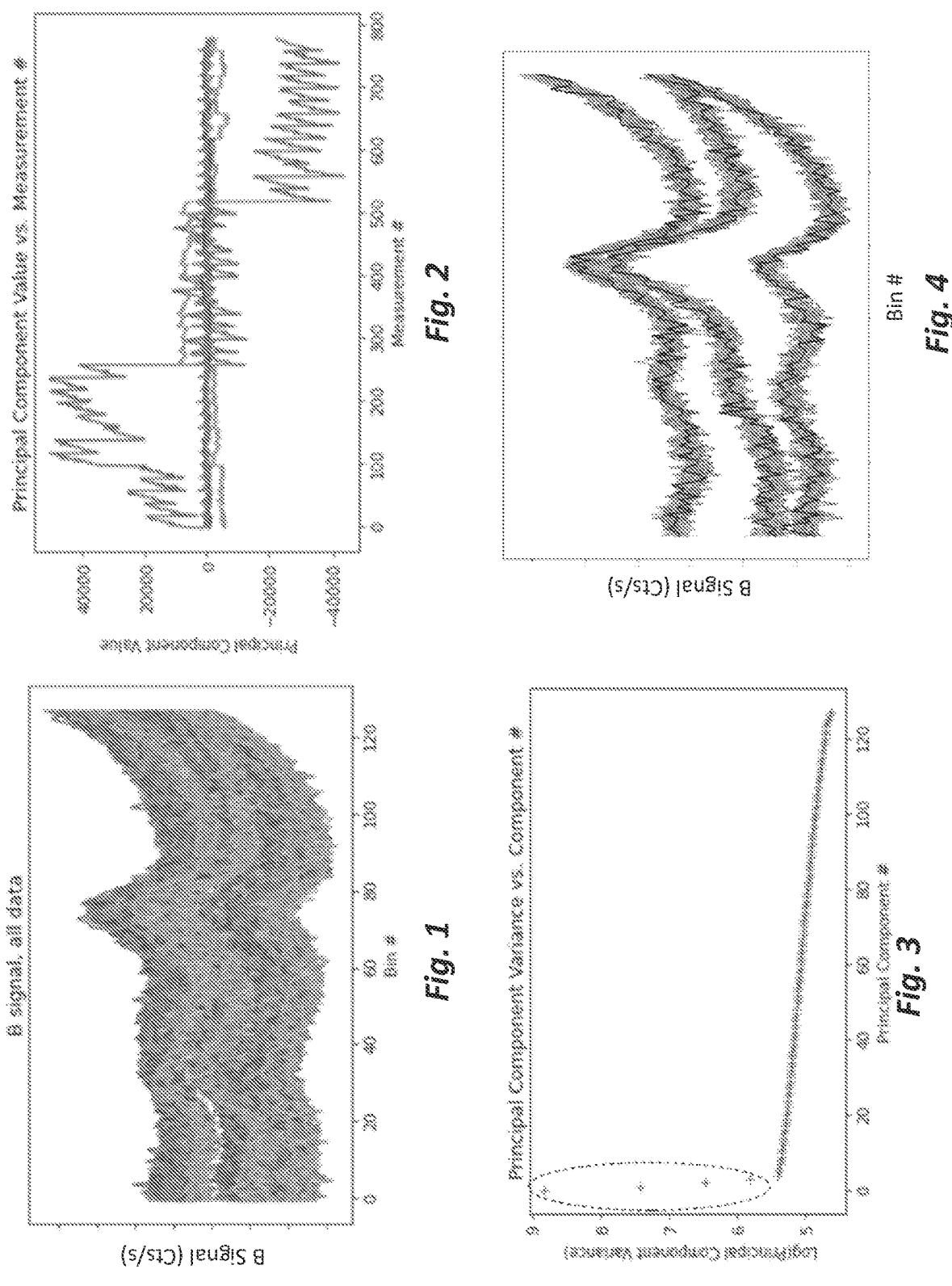
FIG. 1 is a plot of dataset obtained using XPS measurement, according to disclosed embodiment.
FIG. 2 illustrates a plot of principal component analysis (PCA) performed on the dataset of FIG. 1, according to one embodiment.
FIG. 3 is a logarithmic plot of the principal component variance versus the principal component number for the plot of FIG. 2, according to an embodiment.
FIG. 4 illustrate a plot of filtered dataset obtained by applying PCA to the XPS measurement, according to disclosed embodiment.

FIG. 1 is a plot of dataset obtained using XPS measurement of boron concentration in wafers having SiGe:B structures formed therein, showing counts per unit time (here, counts per second) versus bin numbers, wherein each bin corresponds to certain binding energy level (normally in eV units). This data can be used for machine training and may be obtained, e.g., by a standard XPS acquisition (e.g., 1.5-3 minutes of acquisition time) on 13 sites over the wafer, taking 20 measurements at each site. As can be seen, the data is not readily decipherable to determine whether the resulting product meets the specification, or whether an excursion occurred in the process leading to changes in the boron percentage. According to an embodiment, unsupervised machine learning process has been implemented to remove data points that do not contribute to the analysis of whether excursions occur in the fabrication process.

The unsupervised machine learning approach is unique in this context, as the machine is not provided with labeled or scored reference data. For example, in the context of boron concentration, the machine is not provided with reference data indicating the parameters that are characteristic of the proper boron concentration. Instead, the machine needs to self-discover any naturally occurring patterns in the dataset and determine which parameters are important to identifying deviation from the desired process results, e.g., deviation from the desired boron concentration. In the following embodiment, unsupervised machine learning is implemented using principal component analysis (PCA).

FIG. 2 illustrates a plot of PCA performed on the dataset of FIG. 1, showing the principal component value versus the measurement number. In this way, the original spectra is transformed into spectra that are independent of, or orthogonal to each other. The principal component variance was then calculated for each of the points in the dataset. FIG. 3 is a logarithmic plot of the principal component variance versus the principal component number. As can be observed by the dashed oval, there are N (here four) principal components that contribute significantly to the variance, while the remaining principal components contain data which does not materially contribute to the variance. The number of principal components, called a hyperparameter, may be preset for the machine learning or may be part of the selection algorithm to be set automatically during the PCA process.

Once the principal components that meaningfully contribute to the variance have been identified, a reverse PCA process is applied to return to the energy space. For example, as shown in FIG. 4, in this embodiment the dataset plot shown in FIG. 1 is recreated, but using only data belonging to the N principal components that contribute meaningfully to the variance. As can be seen, the plot of FIG. 4 is much "cleaner" than that of FIG. 1, although it corresponds to the same dataset. The data of FIG. 4 can now be analyzed to determine the quality of the SiGe:B deposition process.

One consequence of the disclosed embodiment is that the machine learning does not rely on long training period and does not require repetition of measurements to be used as reference. Rather, by performing the outlined steps, the data of the selected N principal components becomes the reference itself. Any standard algorithm for determining composition or film thickness can be directly applied to the reconstructed dataset, which includes only data points from the selected N principal components. In fact, it has been demonstrated that this approach results in improved accuracy compared to applying the standard algorithm to the initial dataset. Conversely, it has been shown that the acquisition time can be reduced and by employing the disclosed process the same accuracy can be achieved as with standard acquisition time. Acquisition time may be reduced by reducing the time of signal acquisition or by taking fewer measurements at each site.

Figures 5A, 5B:
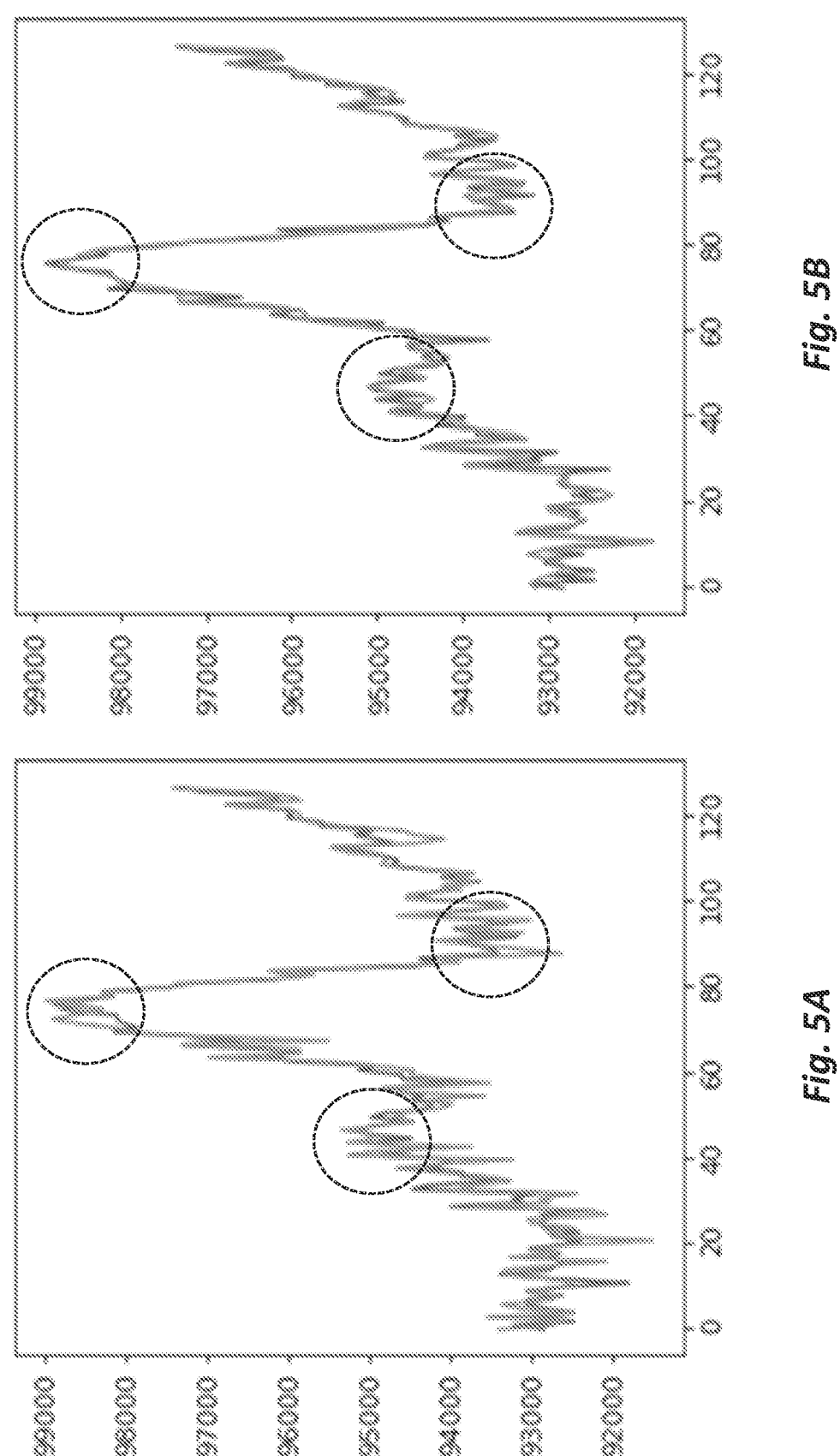

FIG. 5A illustrates a plot of data obtained using full time acquisition versus data acquired using half time acquisition (in this case, using half the number of repetitions per site). FIG. 5B illustrates a plot of data obtained using full time acquisition versus interpolated data, which is data acquired using full-time interpolated acquisition with half the number of points from the spectra.

Figures 6A, 6B:
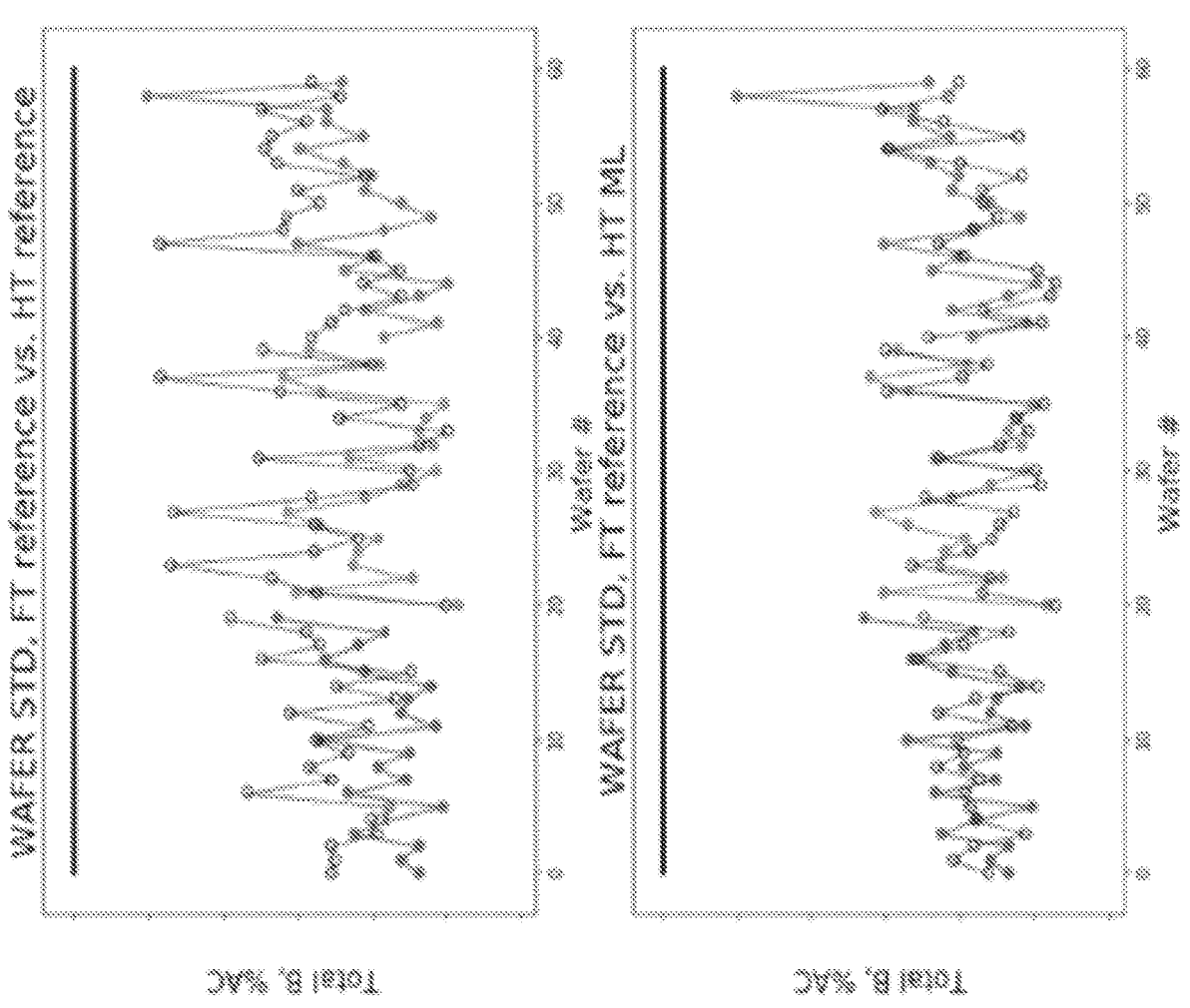

FIG. 6A illustrates the standard deviation of boron percentage calculated using dataset taken at full time (filled dots) and half time (open circles). FIG. 6B illustrates the standard deviation of boron percentage calculated using dataset taken at full time (filled dots) and filtered half time (open circles), i.e., after the half time dataset has been reduced to remove data corresponding to principal components not selected within the N selected principal components. As can be seen, the fit in FIG. 6B is much tighter after the PCA process is applied to the half time dataset shown in FIG. 6A.

In production environment, in one embodiment the process proceeds by obtaining XPS spectra from a wafer undergoing inspection. The unsupervised machine learning process then applies PCA to the spectra data. Then a number of N principal components that generate the highest variation are selected and the data corresponding to these N principal components are used to regenerate the spectra curve. The process then proceeds to determine the intensity by calculating the area under the curve. The intensity is then converted to the desired value (e.g., boron concentration, TiN thickness, etc.) using a predetermine relationship, i.e., the intensity value correlates to the inspected material property. For example, different boron concentration in the layer would result in different emission intensity. The intensities or the corresponding material property values can be plotted in an SPC (statistical process control) chart in order to monitor the fabrication process.

Figures 7, 8, 9:
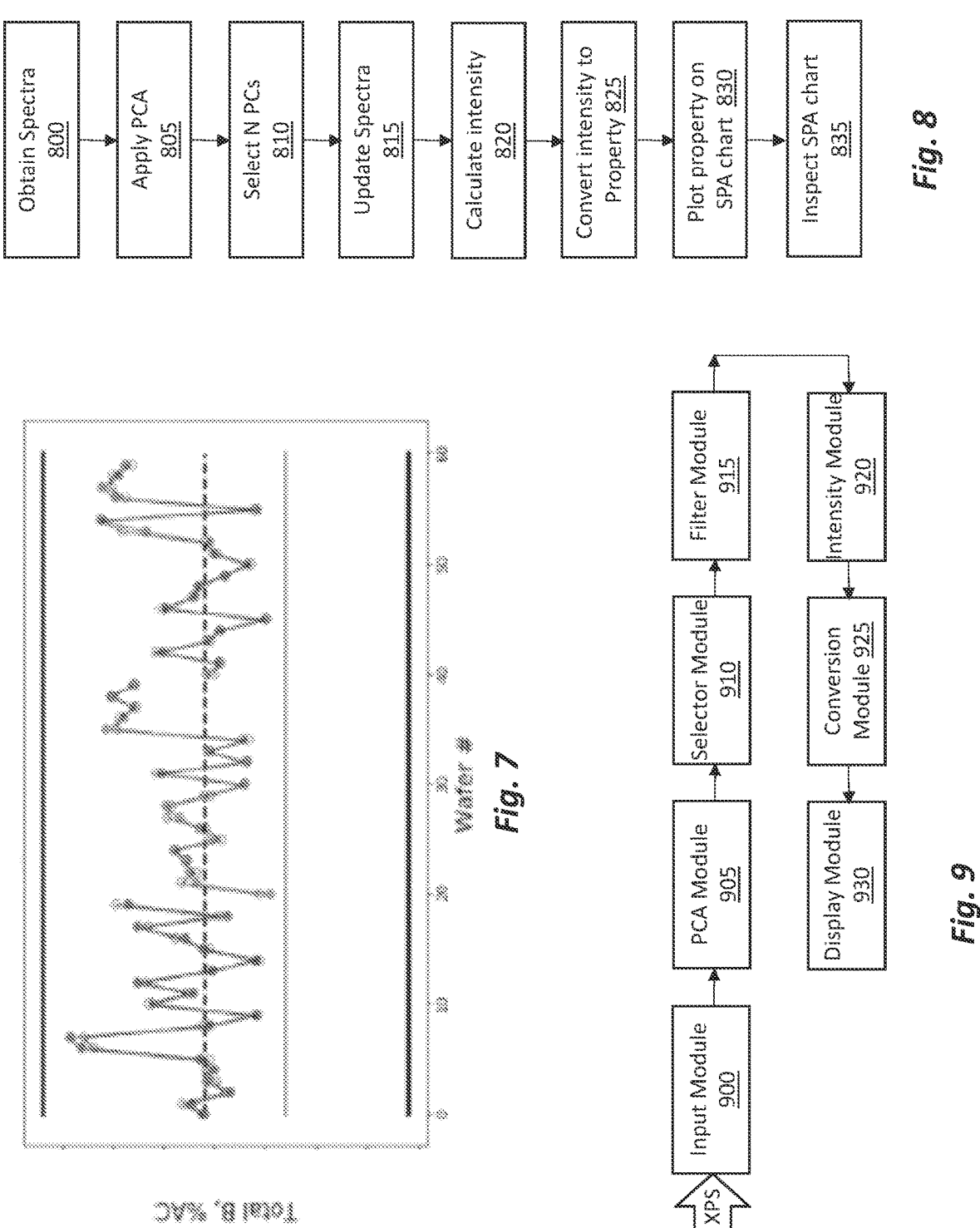
FIG. 7 illustrate an SPC chart of three different XPS tools wherein the black dots represent within-wafer averaged boron percentage calculated from data taken in full time acquisition, while the circles represent within-wafer averaged boron percentage calculated from enhanced half-time data using the embodiments described herein.
FIG. 8 is a flow chart for a method of performing enhanced statistical process control, according to an embodiment.
FIG. 9 is a block diagram illustrating a metrology module for monitoring fabrication process of an integrated circuit, according to an embodiment.

FIG. 7 illustrate an SPC chart of boron percentage obtained from three different XPS tools, wherein the black dots represent boron concentration calculated using data taken in full time acquisition, while the circles represent boron concentration calculated using enhanced half-time data using the embodiments described herein. As can be seen there is a good agreement of the data, showing the process is within the allowable variance.

Thus, disclosed aspects enable an enhanced statistical process control by performing the process outlined in FIG. 8. The process of FIG. 8 starts at step 800 by obtaining dataset corresponding to photoelectron emission from a sample. The dataset represents the spectra of the photoelectrons emitted from the sample. At step 805 the process proceeds by applying principal component analysis to the dataset to obtain principal component variance for each principal component. At 810 the variances are examined to select a number of N relevant principal components having the highest variance values. This can be done by plotting all the variances in descending or ascending order and detecting an inflection point. All variances having values higher than the inflection points are considered to belong to the relevant principal components and are selected as part of the group of N principal components. At step 815 the process proceeds by reverting to the energy space. This is done by selecting from the dataset all relevant data points belonging to the N number of relevant principal components and using only these data points to replot the spectra. At step 820 the updated replot spectra is used to calculate photoelectron emission intensity, i.e., the calculation is performed using only the relevant data points. At step 825 the calculated photoelectron emission intensity is converted to layer property by a known relationship. For example, boron percentage or TiN thickness correlates with emission intensity and this known relationship is used to convert intensity to material property. In step 830 the material property is plotted the on a statistical process control (SPC) chart. Finally, at step 835 the SPC chart is inspected to identify process excursions.

FIG. 9 is a block diagram illustrating a metrology module for monitoring fabrication process of an integrated circuit (IC). As illustrated, the module includes an input module 900 receiving signal indicative of photoelectrons emitted from the IC, e.g., from an XPS metrology tool. In this respect, the entire metrology module may be integrated in an XPS or XRF metrology tool, e.g., implemented as software, hardware, or a combination of both, or may be implemented as part of the controller of the metrology tool, such as a general purpose computer or a specifically tailored computer.

The input module 900 delivers the signal to a principal component analysis (PCA) module 905. The PCA module 905 receives the signal and calculates therefrom variance corresponding to each principal component. A PCA number selector module 910 then selects a number of N principal components according to the calculated variance. A filtering module 915 selects from the original XPS signal only the data points corresponding to the selected N principal components. An intensity module 920 then uses the selected data points to calculate an intensity value of the photoelectron emissions, i.e., calculates the area under the curve of a plot of the selected data points. The conversion module 925 applies a known relationship to convert the calculated intensity to a material property value (e.g. concentration percentage or layer thickness). The display module 930 then displays the material property value on a monitor, generally in the form of an entry in a PCA chart.

Thus, a method for monitoring process excursions in semiconductor processing of an integrated circuit (IC) is provided, comprising the steps of: irradiating the IC to thereby generate emissions from the IC; collecting the emissions from the IC using one of x-ray photoelectron spectroscopy (XPS) or x-ray fluorescence spectroscopy (XRF) and generating from the emissions a dataset corresponding to photon count per unit time versus kinetic energy of emitted photons; performing principal component analysis on the dataset to thereby obtain principal component values from the dataset; selecting a number of N principal components that exhibit high variance contribution compared to remaining principal components; removing from the dataset all values corresponding to the remaining principal components to thereby obtain filtered dataset; analyzing the filtered dataset to determine presence of process excursion. The number N may be preset or selecting a number of N principal components may comprise calculating variance for each principal component and plotting the variance versus corresponding principal component to identify an inflection point; and setting N to correspond to the number of principal components having higher variance from the inflection point. Analyzing the filtered dataset may comprise calculating emission intensity from the filtered dataset, converting the emission intensity to material property value, and plotting the material property value on a statistical process control chart.

Also, a metrology module for monitoring fabrication process of an integrated circuit (IC) is enabled, the module comprising: an input module receiving signal indicative of photoelectrons emitted from the IC; a principal component analysis (PCA) module receiving the signal and calculating therefrom variance corresponding to each principal component; a PCA number selector selecting a number of N principal components according to the calculated variance; a filtering module selecting from the signal data points corresponding to the N principal components; an intensity module calculating emission intensity from the output of the filter module; a conversion module converting the emission intensity into material property value; and a display module plotting the material property value. The input port may be coupled to a sensor of an x-ray photoelectron spectroscopy (XPS) or to a sensor of an x-ray fluorescence spectroscopy (XRF). The signal may correspond to thickness or chemical composition of a sample.

Further, a machine readable medium is provided having stored thereon executable program code which, when executed, causes a machine to perform a method for determining anomalies in a property of a fabricated layer of a sample, the method comprising: collecting photoelectron emissions from the sample using one of x-ray photoelectron spectroscopy (XPS) or x-ray fluorescence spectroscopy (XRF) and generating from the emissions a dataset corresponding to photoelectron count per unit time versus kinetic energy of emitted photoelectrons; performing principal component analysis on the dataset to thereby obtain principal component values from the dataset; selecting a number of principal components that exhibit high variance contribution compared to remaining principal components; removing from the dataset all values corresponding to the remaining principal components to thereby obtain filtered dataset; and analyzing the filtered dataset to determine presence of process excursion. Analyzing the filtered dataset may include calculating total intensity of photoelectron emission using the filtered dataset, converting the intensity into a material property value, and plotting the material property value on a SPC chart.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A computerized method for monitoring process excursions in semiconductor processing of an integrated circuit (IC), comprising the steps of:

irradiating the IC to thereby generate emissions from the IC;

collecting the emissions from the IC using one of x-ray photoelectron spectroscopy (XPS) or x-ray fluorescence spectroscopy (XRF) and generating from the emissions a dataset corresponding to count per unit time versus kinetic energy;

performing principal component analysis on the dataset to thereby obtain principal component values from the dataset;

selecting a number of principal components that exhibit high variance contribution compared to remaining principal components;

removing from the dataset all values corresponding to the remaining principal components to thereby obtain filtered dataset; and, analyzing the filtered dataset to determine presence of process excursion.

2. The method of claim 1, wherein performing principal component analysis further comprises calculating principal component variance for each principal component value in the dataset.

3. The method of claim 2, wherein selecting a number of principal components comprises plotting the calculated principal component variances in descending or ascending order and detecting an inflection point and selecting all principal component variances having values higher than the inflection point.

4. The method of claim 2, wherein obtaining the filtered dataset further comprises selecting from the emissions values corresponding to count per unit time versus kinetic energy of only data belonging to the N principal components that contribute meaningfully to the variance.

5. The method of claim 4, further comprising plotting a spectra curve of the filtered dataset and determining emission intensity by calculating the area under the spectra curve.

6. The method of claim 5, further comprising converting the emission intensity to material property values of the IC.

7. The method of claim 6, further comprising plotting the material property values in a statistical process control chart.

8. The method of claim 7, wherein the material property values comprise one of material concentration and thickness.

9. A metrology module for monitoring fabrication process of an integrated circuit (IC), the metrology module comprising:

an input module receiving signal indicative of emissions from the IC;

a principal component analysis (PCA) module receiving the signal and calculating therefrom variance corresponding to each principal component;

a PCA number selector selecting a number of N principal components according to the calculated variance;

a filtering module selecting from the signal data points corresponding to the N principal components;

an intensity module calculating emission intensity from the output of the filter module;

a conversion module converting the emission intensity into material property value; and a display module plotting the material property value.

10. The metrology module of claim 9, wherein the signal comprises one of x-ray photoelectron spectroscopy (XPS) signal and x-ray fluorescence spectroscopy (XRF) signal.

11. The metrology module of claim 9, wherein the input module is coupled to an x-ray photoelectron spectroscopy (XPS) sensor or to an x-ray fluorescence spectroscopy (XRF) sensor.

12. The metrology module of claim 9, wherein the PCA number selector plots the principal component variances in descending or ascending order to determine an inflection point, and selects all principal component variances having values higher than the inflection point.

13. The metrology module of claim 9, wherein the intensity module plots a spectra curve of data points selected by the filtering module, and determines emission intensity by calculating the area under the spectra curve.

14. The metrology module of claim 9, wherein the conversion module converts the emission intensity into one of material concentration and layer thickness.

15. A non-transitory machine readable medium having stored thereon executable program code which, when executed, causes a machine to perform a process for determining anomalies in a property of a fabricated layer of a sample, the process comprising: collecting photoelectron emissions from the sample and generating from the emissions a dataset corresponding to photoelectron count per unit time versus kinetic energy of emitted photoelectrons; performing principal component analysis on the dataset to thereby obtain principal component values from the dataset; obtaining a number N of principal components; removing from the dataset all values not belonging to the N principal components to thereby obtain filtered dataset; and analyzing the filtered dataset to determine presence of process excursion.

16. The machine readable medium of claim 15, wherein collecting photoelectron emissions comprises using one of x-ray photoelectron spectroscopy (XPS) or x-ray fluorescence spectroscopy (XRF).

17. The machine readable medium of claim 15, wherein the process further comprises calculating principal component variance for each principal component value in the dataset.

18. The machine readable medium of claim 15, wherein obtaining a number N of principal components comprises selecting principal components that exhibit high variance contribution compared to remaining principal components.

19. The machine readable medium of claim 15, wherein obtaining a number N of principal components comprises selecting a preset number N.

20. The machine readable medium of claim 15, wherein analyzing the filtered dataset includes calculating total intensity of photoelectron emission using the filtered dataset, converting the intensity into a material property value, and plotting the material property value on a statistical process control chart.

\* \* \* \* \*